Patented Apr. 28, 1942

2,280,995

UNITED STATES PATENT OFFICE 2,280,995

MUD DISPERSION

Robert B. Booth, Springdale, Conn., assignor to American Cyanamid Company, New York, N. Y., a corporation of Maine No Drawing. Application May 31, 1940,
Serial No. 338,241

13 Claims. (Cl. 252—8.5)

This invention relates to a method for controlling the viscosity characteristics of aqueous mud or clay dispersions. Dispersions of this type are used in the ceramics industry, where they are known as clay slips, and in the preparation of paper sizes, but their largest commercial use is probably found in the drilling of oil wells.

In the drilling of oil wells and other deep wells by rotary drilling processes it is now the practice to recirculate a fluid called "drilling mud" downwardly through the hollow drill pipe, across the face of the drill bit, and upwardly through the drill hole. The drilling mud serves to cool and lubricate the drill bit, to raise the drilling cuttings to the surface of the ground and to seal the sides of the well to prevent loss of water and drilling fluids into the formation through which the drill hole is being bored. After each passage through the well the mud is passed through a settling tank or trough, wherein the sand and drill cuttings are separated with or without screening after which the fluid is again pumped into the drill pipe by a mud pump.

A satisfactory drilling mud must possess certain definite characteristics. It must have sufficient fluidity to permit pumping at the proper rate without excessive power requirements and must be sufficiently thixotropic in character to prevent the settling of sand and cuttings in the well when the circulation is stopped temporarily for exchanging bits, fishing for tools or for other purposes. The two most important properties of rotary drilling muds are the property of density and the property of viscosity and shearing strength, which last property is controlled by the colloidal dispersion of the mud and its graduation of particle size. Viscosity and dispersion are usually considered simultaneously with density, the problem being to obtain adequate density, low viscosity and a permanent suspension of clay solids capable of supporting sand and cuttings within the well but which will release the sand and cuttings outside the well.

The viscosity in thixotropic mud may be measured by the Marsh funnel viscosimeter and the results are expressed as the number of seconds for a given volume to flow through an orifice of predetermined size. In muds of this character the measured viscosity depends to a considerable extent on movement or on the elapsed time since movement has ceased, as one of the chief contributing factors to this viscosity is the tendency of the mud to form a gel upon standing. This property of thixotropy or gelation upon standing has been described as resulting from the presence of a shell of surface hydration surrounding each clay particle and separating it from other clay particles similarly hydrated. The normal forces of attraction between the particles are opposed by forces of repulsion existing by virtue of these shells of surface hydration, with the result that relative movement between the clay particles is hindered and the mud has a high structural viscosity.

I have now discovered that the normal structural viscosity of drilling muds and similar mud dispersions can be modified to a more advantageous value by the incorporation of dicyandiamide therein. Dicyandiamide is an organic nitrogen compound of the probable structural formula $HN:C(NH_2)NH.CN$. It is a neutral, water-soluble substance that has no corrosive action on metal, and can be used in high concentrations without damaging in any way the metal of the well casing or drilling machinery. Since the action of the dicyandiamide is perfectly general, it is understood that the term "mud dispersions" in the following claims includes clay dispersions as well as any other aqueous dispersions of earthy materials.

Although dicyandiamide can be used as the sole viscosity reducing agent for clay slips, drilling muds and other mud or clay dispersions, it possesses even more remarkable characteristics when used in admixture with or as a supplement to other viscosity reducing agents. One of its most important characteristics, either when used alone or in admixture with other agents, is its property of maintaining the viscosity of mud fluids at a minimum value irrespective of the addition of further amounts of conditioning agents. This is particularly important in oil well drilling, for it is customary to condition the mud initially and also to add further amounts of conditioning agent to the mud as the drilling proceeds in order to offset the flocculating action of high temperatures and inorganic salts dissolved from the formation. When many of the known deflocculating agents are used, such as for example the water-soluble salts of polyphosphoric acids, the increasing concentration of treating agent that results from this practice soon begins to reflocculate or thicken the mud so that its final viscosity may be as high as or even higher than the original value of the untreated mud dispersion. I have found, and have demonstrated by the figures shown in the following examples, that the admixture of dicyandiamide with a viscosity reducing agent of this type will overcome its tendency to reflocculate the mud at high concentrations, so that the viscosity of the mud remains at a lowered value during the entire drilling operation. This is one of the most important advantages of my invention.

The dicyandiamide may be added to clay slips, paper sizes, drilling muds, or other mud or clay dispersions in any suitable quantities. These muds and clays are obtained from the most varied sources; in oil well drilling they are sometimes found in the well itself, at other times they are dug from neighboring deposits, while in many cases they may be compounded from mixtures of natural clays with added gel-forming materials such as bentonite and added weighting materials such as barytes. As has been explained, the dicyandiamide is preferably used in admixture with or as a supplement to other conditioning or viscosity reducing agents, and any known or approved mud deflocculating agent may be employed in conjunction therewith. Suitable deflocculating agents of this class that may be used in admixture with dicyandiamide are, for example, the water-soluble salts of polyphosphoric acids such as sodium tetraphosphate, tetrasodium pyrophosphate, sodium hexa metaphosphate, sodium silicate, the corresponding potassium salts, tannic acid, humic acid, lignic acid, pyrogallic acid, waste sulfite liquor, soda black liquor or extract, solutions or dispersions of the sap brown type, tannins and the like, and the ureas, thioureas and urea derivatives described and claimed in my copending application, Serial No. 338,050, filed May 31, 1940.

A class of deflocculating agents that may be used with special advantage in admixture with dicyandiamide in the treatment of drilling muds are the "saturated" alkali metal polyphosphates in which all the acid groups are neutralized or saturated with metallic or positive ions and in which the ratio of metal oxide (Me$_2$O) to P$_2$O$_5$ is greater than 1:1 but less than 2:1. This definition includes all the saturated alkali metal polyphosphates of the empirical formula

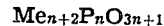

$$Me_{n+2}P_nO_{3n+1}$$

in which Me is an alkali metal and $n$ is an integer greater than 2, and particularly a number of polyphosphate compositions obtained by fusion processes. The definition also includes mixed alkali metal polyphosphates as well as mixtures of two or more alkali metal polyphosphates of different chemical constitution. Typical phosphates of this class are saturated sodium and potassium triphosphates, in which the Me$_2$O to P$_2$O$_5$ ratio is 5:3 and the alkali metal polyphosphates or phosphate mixtures prepared by fusing alkali metal ortho and pyrophosphates with phosphorous pentoxide in the proper proportions as described in the copending application of C. F. Bonnet and R. B. Booth, Serial No. 331,418, filed April 24, 1940. Other alkali metal polyphosphates falling within this definition are sodium and potassium hexaphosphate, sodium and potassium heptaphosphates Me$_9$P$_7$O$_{22}$, and sodium and potassium octaphosphates Me$_{10}$P$_8$O$_{25}$, as well as the corresponding mixed phosphates containing both sodium and potassium or other atoms or groups included within the class of alkali metals forming stable complex phosphates. It will be noted that the above definition also includes sodium and potassium tetraphosphate in which the ratio of Me$_2$O to P$_2$O$_5$ is 3:2.

The invention in its broader aspects is not limited by the method used in incorporating the dicyandiamide with the mud or clay dispersion, and any suitable method of incorporation may be used. In well drilling one method that has been employed with success is to mix a solution of the dicyandiamide, which may or may not contain other viscosity reducing agents as noted above, with the mud as it comes out of the well to facilitate the screening or settling out of sand and cuttings. In other cases the dicyandiamide composition may be added just ahead of the mud pump so that the pumping operation will insure a thorough mixing. Still another method is to introduce a solution of the dicyandiamide composition into the mechanical de-gelling mechanism, and other methods may be resorted to if desired. However, it should be noted that the remarkable property of dicyandiamide in deflocculating a mud fluid that has already been thickened by the addition of excessive amounts of other viscosity reducing agents renders this material of especial value as an addition agent to mud fluids that have already been used for some time, and in many cases the dicyandiamide may not be added until after the first few days of a drilling operation employing fresh drilling mud and other deflocculating agents.

As is well known dicyandiamide is a polymer of cyanamide, which is obtained commercially as calcium cyanamide by the reaction of calcium carbide with nitrogen at high temperatures. Dicyandiamide is obtained from calcium cyanamide, or from free cyanamide, by the action of acids or alkalies at high temperature, or even by simple hydrolysis with hot water. Accordingly, my invention can also be practiced in some cases by introducing either a water-soluble cyanamide salt or free cyanamide into the drilling mud, for under the influence of the high temperatures encountere in drilling oil wells the cyanamide will polymerize to dicyandiamide. Insofar as I have been able to determine, neither cyanamide nor cyanamide salts are in themselves deflocculating agents for oil well drilling muds, but they are readily polymerized by the action of heat and this polymerization is favored by the pH values of 9–9.6 which are frequently attained in drilling muds by the addition of alkali metal phosphates. Accordingly it should be understood that whereever the addition of dicyandiamide is specified in the following claims, the addition of materials capable of producing dicyandiamide in situ is also included.

In ordinary drilling practice the mud conditioning agents are added in amounts less than 0.4 pound per 42 gallon barrel of mud, and quantities of 1 pound per barrel are seldom exceeded in any single treatment. However, as continuous or intermittent additions may take place over considerable periods of time it is impossible to define the proper concentration in terms of the quantities added and this must be determined in the field. It should be understood, therefore, that the present invention includes the addition to mud or clay dispersions of dicyandiamide or compositions containing this material in any amounts which, in the judgment of the operator, will give the proper viscosity that may be desired for the purpose in mind.

The invention will be illustrated in greater detail by the following specific examples. It should be understood, however, that although these examples may describe in detail some of the more specific aspects of the invention they are given primarily for purposes of illustration and the invention in its broadest aspects is not limited thereto.

EXAMPLE 1

A drilling mud dispersion having a specific gravity of 1.32 was made from McKittrick clay, which is found in California and widely used in oil well drilling. Viscosity determinations were made on this clay dispersion using the Marsh Funnel Viscosimeter at 500/500 cc. The procedure was as follows:

A solution of 0.4 gram of the deflocculating or viscosity reducing agent in 7 cc. of water is added to 700 cc. of the mud dispersion which is then stirred for 3 minutes with a high speed mechanical agitator and 500 cc. are immediately poured through a sieve into the funnel viscosimeter. The viscosity is expressed as the number of seconds required for the funnel to discharge.

The second and third additions of the treating agent are also made as aqueous solutions of the above concentration, thus diluting the original 700 cc. of mud with about 28 cc. of water. It has been found that this is the amount of water to approximate field conditions. In all further additions the dry reagent is used and the mixture is stirred for 5 minutes to insure a uniform incorporation.

In this manner the cumulative effect of continuous additions of the mud-treating agent is observed. The results obtained by adding dicyandiamide and mixtures of dicyandiamide with other viscosity reducing agents is shown in the following table. In the headings of this table, and also in the tables of the other examples, dicy means dicyandiamide, TSPP means anhydrous tetrasodium pyrophosphate Na$_4$P$_2$O$_7$ and STP means anhydrous sodium tetraphosphate Na$_6$P$_4$O$_{13}$.

EXAMPLE 2

In order to demonstrate the value of dicyandiamide for thinning or deflocculating mud dispersions that have become thickened by the cumulative addition of excessive amounts of other treating agents a sample of the mud described in Example 1 was first treated with tetrasodium pyrophosphate until the viscosity was greater than the initial value and then successive additions of dicyandiamide were made and the resulting viscosities determined. The procedure followed was the same as that described in Example 1. The results were as follows:

TABLE 2

Mud thickened with TSPP; then thinned with dicy

| TSPP | | DICY | |
| --- | --- | --- | --- |
| Lbs./bbl. (cumulative) | Viscosity (500/500) | Lbs./bbl. (cumulative) | Viscosity (500/500) |
| Start | 59.3 | Start | 69.0 |
| 0.2 | 32.8 | 0.5 | 61.0 |
| 0.4 | 30.6 | 1.0 | 49.5 |
| 0.8 | 28.3 | 1.5 | 42.7 |
| 1.3 | 27.9 | 2.0 | 37.8 |
| 1.8 | 27.3 | 2.5 | 35.8 |
| 2.3 | 26.6 | 3.0 | 32.5 |
| 3.3 | 26.1 | 3.5 | 30.7 |
| 5.8 | 27.5 | | |
| 8.3 | 39.5 | | |
| 10.8 | 69.0 | | |

EXAMPLE 3

Water loss tests were run on a sample of the mud dispersion of Example 1 and on other samples to which 0.8 lb. per barrel of the viscosity reducing agents had been added. The tests were made on the standard 100 pound wall-building tester, which consists of a 3 inch closed pressure filter connected with a compressed nitrogen tank and provided with a graduate for measuring the volume of filtrate. Using 100 pounds pressure on the filter and an average filtration temperature

TABLE 1

*Marsh funnel viscosity—seconds (500/500)*

| Lbs./bbl. cumulative | Control test, no reagent | Dicy | 95% dicy 5% TSPP | 85% dicy 15% TSPP | 75% dicy 25% TSPP | 50% dicy 50% TSPP | 25% dicy 75% TSPP | 75% dicy 25% STP | 25% dicy 75% STP | STP | TSPP |
| --- | --- | --- | --- | --- | --- | --- | --- | --- | --- | --- | --- |
| Start | 62.4 | 61.0 | 63.3 | 59.0 | 61.1 | 58.4 | 61.7 | 60.0 | 60.7 | 65.0 | 65.0 |
| 0.2 | 57.5 | 53.6 | 54.8 | 45.8 | 38.4 | 34.1 | 34.2 | 47.4 | 37.7 | 39.0 | 34.3 |
| 0.4 | 53.1 | 52.1 | 48.5 | 35.5 | 31.8 | 31.0 | 31.7 | 39.7 | 31.8 | 33.2 | 31.1 |
| 0.8 | 47.9 | 44.5 | 36.7 | 30.5 | 28.9 | 29.5 | 29.3 | 32.6 | 28.9 | 29.7 | 28.9 |
| 1.3 | 47.5 | 44.0 | 31.6 | 29.2 | 28.5 | 28.3 | 28.2 | 29.9 | 27.5 | 28.4 | 27.4 |
| 1.8 | 48.1 | 43.0 | 30.4 | 28.6 | 27.4 | 27.8 | 27.7 | 28.4 | 27.1 | 27.5 | 27.1 |
| 2.3 | 47.9 | 43.0 | 28.5 | 27.8 | 26.8 | 26.9 | 26.9 | 27.4 | 26.5 | 27.1 | 26.7 |
| 3.3 | 49.4 | 41.4 | 28.2 | 27.5 | 26.6 | 26.5 | 26.8 | 27.4 | 26.5 | 25.7 | 26.1 |
| 5.8 | 48.9 | 38.7 | 27.6 | 27.3 | 26.1 | 26.1 | 26.7 | 26.5 | 26.2 | 26.3 | 27.9 |
| 8.3 | 46.9 | 36.8 | 27.1 | 26.8 | 25.3 | 26.3 | 28.1 | 25.9 | 25.9 | 26.8 | 35.6 |
| 10.8 | 47.7 | 35.8 | 26.9 | 26.5 | 25.5 | 26.4 | 32.1 | 25.5 | 28.0 | 29.9 | 62.1 |
| 13.3 | 47.4 | 36.1 | 26.4 | 26.2 | 25.1 | 26.7 | 41.6 | 25.3 | 26.4 | 39.5 | 85.0 |
| 18.3 | 46.9 | 37.4 | 26.3 | 26.0 | 25.4 | 28.2 | 57.1 | 25.4 | 28.7 | 73.7 | |
| 23.3 | 46.4 | 39.2 | 26.5 | 26.0 | 25.4 | 30.1 | | 25.2 | 31.4 | | |
| 28.3 | 46.8 | 40.0 | 26.1 | 26.2 | 25.3 | 36.5 | | 25.3 | 35.6 | | |
| 33.3 | 48.5 | 42.5 | 26.0 | 26.3 | 26.1 | 41.7 | | 25.2 | 39.2 | | |
| 38.3 | | | 26.3 | 26.5 | 26.6 | 46.4 | | 25.1 | 39.1 | | |
| 43.3 | | | 26.6 | 28.6 | 28.3 | 48.0 | | 25.9 | 41.1 | | |
| 48.3 | | | 26.1 | 27.3 | 30.0 | 52.0 | | 25.5 | 44.9 | | |
| 53.3 | | | 26.1 | 27.8 | 33.5 | | | 26.4 | 50.1 | | |
| 58.3 | | | 26.3 | 28.9 | 37.2 | | | 26.3 | 55.2 | | |
| 63.3 | | | 26.9 | 29.3 | 42.0 | | | 27.0 | | | |
| 68.3 | | | 27.0 | 32.1 | 45.0 | | | 27.8 | | | |
| 73.3 | | | 27.2 | | 47.8 | | | 28.9 | | | |
| 78.3 | | | 28.0 | | 50.0 | | | 30.1 | | | |
| 83.3 | | | | | | | | 31.6 | | | | of 25° C., the following uncorrected values were obtained:

TABLE 3

| Time (minutes) | Volume (cc.) of filtrate | | | | | | |
|---|---|---|---|---|---|---|---|
| | Control | STP | Dicy | TSPP | 75% dicy 25% TSPP | 75% dicy 25% STP | 25% dicy 75% TSPP |
| 10 | 5.1 | 3.9 | 5.2 | 3.7 | 4.0 | 5.0 | 3.7 |
| 20 | 7.5 | 6.2 | 7.6 | 5.7 | 6.1 | 8.0 | 5.8 |
| 30 | 9.3 | 7.7 | 9.5 | 7.2 | 7.6 | 9.4 | 7.3 |
| 40 | 10.9 | 9.2 | 10.9 | 8.5 | 8.8 | 11.0 | 8.6 |
| 50 | 12.4 | 10.5 | 12.5 | 9.7 | 10.1 | 12.3 | 9.8 |
| 60 | 13.6 | 11.7 | 13.8 | 10.7 | 11.2 | 13.7 | 10.8 |
| Marsh funnel viscosity at start | 46.3 | 29.2 | 45.9 | 28.2 | 29.0 | 32.4 | 27.9 |
| Filter cake (inches) | 5/32 | 5/32 | 5/32 | 5/32 | 5/32 | 5/32 | 5/32 |

In the use of the above described testing apparatus there is a constant error in the volume of filtrate due to an initial loss or gain at the start of the experiment. The amount of this error may be determined by plotting the volume of filtrate against the square root of the time. When the proper correction was applied to the figures of the above table it was found that the volumes of filtrate in the run using dicyandiamide alone were practically identical with the control, showing that no substantial change in water loss will result when this material is used.

EXAMPLE 4

The value of dicyandiamide as a deflocculating agent in admixture with viscosity reducing agents other than phosphates is shown in the following table. It will be noted that there is no rethickening of the mud dispersions after the original deflocculation, even when very large amounts of the treating agent are used.

TABLE 4

*Marsh funnel viscosity—seconds (500/500)*

| Lbs./bbl. cumulative | 50% dicy 50% urea | 50% urea 50% thiourea | 50% dicy 50% thiourea |
|---|---|---|---|
| Start | 59.0 | 56.9 | 62.2 |
| 0.2 | 54.3 | 51.4 | 57.4 |
| 0.4 | 51.4 | 48.2 | 53.8 |
| 0.8 | 45.5 | 43.4 | 47.0 |
| 1.3 | 44.9 | 43.4 | 46.0 |
| 1.8 | 45.0 | 43.5 | 45.4 |
| 2.3 | 43.6 | 43.2 | 46.5 |
| 3.3 | 43.5 | 41.9 | 43.5 |
| 5.8 | 41.6 | 40.9 | 42.5 |
| 8.3 | 39.8 | 39.0 | 41.0 |
| 10.8 | 38.0 | 38.0 | |
| 13.3 | 36.8 | 35.9 | 36.0 |
| 18.3 | 34.5 | 34.5 | |
| 23.3 | 34.7 | 32.6 | 32.2 |
| 28.3 | 33.1 | 32.3 | |
| 33.3 | 32.7 | 31.7 | 32.0 |
| 38.3 | 31.5 | 29.4 | |
| 43.3 | 31.2 | 28.2 | 30.2 |
| 48.3 | 31.2 | 27.8 | |
| 53.3 | 29.9 | 27.5 | 30.2 |
| 58.3 | 29.9 | 27.4 | |
| 63.3 | 29.9 | 25.7 | 29.5 |
| 68.3 | 29.7 | 25.8 | |
| 73.3 | 29.4 | 26.3 | 29.5 |
| 78.3 | 30.1 | 25.6 | |
| 83.3 | 29.0 | 25.6 | |
| 88.3 | 28.9 | | |
| 93.3 | | | 32.0 |

What I claim is:

1. A method of controlling the viscosity of mud dispersions which comprises admixing dicyandiamide therewith.

2. A method of controlling the viscosity of drilling muds which comprises incorporating dicyandiamide therein.

3. A method of reducing the viscosity of drilling muds which comprises admixing dicyandiamide therewith and also adding another viscosity reducing agent.

4. A method of reducing the viscosity of mud dispersions which comprises adding thereto a water-soluble salt of a polyphosphoric acid capable of reducing the viscosity thereof and also adding dicyandiamide.

5. A method of reducing the viscosity of mud dispersions which comprises adding thereto a saturated alkali metal polyphosphate having a ratio of alkali metal oxide to $P_2O_5$ greater than 1:1 and less than 2:1 and also adding dicyandiamide.

6. A method of reducing the viscosity of mud dispersions which comprises adding thereto a compound of the formula $Me_{n+2}P_nO_{3n+1}$ in which Me is an alkali metal and $n$ is an integer greater than 2, and also adding dicyandiamide.

7. A method of adjusting the viscosity of drilling muds which comprises adding thereto quantities of a viscosity reducing agent other than dicyandiamide sufficient to reduce the viscosity thereof, continuing the addition of such agent during drilling, and finally adding dicyandiamide to the mixture after the drilling has progressed to a substantial extent.

8. An aqueous mud dispersion containing dicyandiamide.

9. A drilling fluid comprising a thixotropic clay dispersion and dicyandiamide.

10. An aqueous mud dispersion containing a viscosity reducing agent having the property of rethickening the mud and also containing dicyandiamide.

11. An aqueous mud dispersion containing a water soluble salt of a polyphosphoric acid capable of reducing the viscosity thereof and also containing dicyandiamide.

12. An aqueous mud dispersion containing a saturated alkali metal polyphosphate having a ratio of alkali metal oxide to $P_2O_5$ greater than 1:1 and less than 2:1 and also containing dicyandiamide.

13. An aqueous mud dispersion containing a compound of the formula $Me_{n+2}P_nO_{3n+1}$ in which Me is an alkali metal and $n$ is an integer greater than 2 and also containing dicyandiamide.

ROBERT B. BOOTH.